United States Patent
Nefcy et al.

(10) Patent No.: US 8,384,237 B2
(45) Date of Patent: Feb. 26, 2013

(54) LOW VOLTAGE BUS STABILITY

(75) Inventors: Barney D. Nefcy, Novi, MI (US);
Marvin P. Kraska, Dearborn, MI (US);
Mark Ferrel, Brighton, MI (US); Walt J. Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 12/843,983

(22) Filed: Jul. 27, 2010

(65) Prior Publication Data
US 2012/0025601 A1    Feb. 2, 2012

(51) Int. Cl.
*B60L 1/00* (2006.01)
(52) U.S. Cl. .......................................... 307/9.1
(58) Field of Classification Search .................... 307/9.1
See application file for complete search history.

(56) References Cited

U.S. PATENT DOCUMENTS

| | | | |
|---|---|---|---|
| 8,210,145 B2 * | 7/2012 | Handa et al. | 123/179.3 |
| 2006/0058897 A1 | 3/2006 | Senda et al. | |
| 2009/0107443 A1 | 4/2009 | Sarbacker et al. | |
| 2009/0243387 A1 | 10/2009 | Conen et al. | |

FOREIGN PATENT DOCUMENTS

JP    2002176704 A    6/2002

* cited by examiner

*Primary Examiner* — Robert L. DeBeradinis
(74) *Attorney, Agent, or Firm* — David Kelley; Lewinski Law Group (57) ABSTRACT

Systems and methods provide voltage stability for a low voltage bus coupling a DC/DC converter with a low voltage load comprising one or more vehicle accessories. The DC/DC converter can be coupled to a high voltage battery, the low voltage load, and a starter circuit configured for starting an engine. Prior to engaging a starter motor to start the engine, the DC/DC converter can be isolated from the starter circuit so as to be shielded from any large current demand during an engine start event. While starting the engine, the starter motor can draw current from a secondary battery, while the DC/DC converter provides a sufficient and stable voltage to the vehicle low voltage accessories. After completion of the engine start event, the DC/DC converter can be recoupled to the starter circuit, allowing the high voltage battery to charge the secondary battery.

21 Claims, 5 Drawing Sheets

LOW VOLTAGE BUS STABILITY

FIELD OF INVENTION

This invention relates generally to power conversion circuits deployed in hybrid electric vehicles, and more particularly to those circuits in which a high voltage battery is used to provide voltage to a low voltage vehicle load and a starter motor circuit

BACKGROUND OF INVENTION

Hybrid electric vehicles employ an electric drive system that has lower energy costs and emits fewer pollutants than a conventional internal combustion engine (ICE) drive system. Various configurations of hybrid electric vehicles have been developed. In a first configuration, an operator can choose between electric operation and ICE operation. In a series hybrid electric vehicle (SHEV) configuration, an engine, typically an ICE, is connected to an electric motor referred to as a generator. The generator, in turn, provides electricity to a battery and another motor referred to as a traction motor. In the SHEV, the traction motor is the sole source of wheel torque. There is no mechanical connection between the engine and the drive wheels. In a further configuration, a parallel hybrid electric vehicle (PHEV), an engine and an electric motor cooperate to provide the wheel torque to drive the vehicle. In addition, in a PHEV configuration, the motor can be used as a generator to charge the battery from the power produced by the ICE. A further configuration, a parallel/series hybrid electric vehicle (PSHEV), has characteristics of both the SHEV and the PHEV.

Electric propulsion in an HEV can be performed by an electric drive system that can include a number of components, typically at least including a power conversion circuit and a motor. In this arrangement, the power conversion circuit can controllably transfer power from a power source to the motor to drive a load. A typical power conversion circuit can comprise a power source, such as a high voltage battery, and an inverter circuit that can provide a three-phase current to an electric machine. As discussed above, at times a hybrid vehicle can operate in an electric drive mode, propelled solely by an electric motor, and at other times an ICE can cooperate to drive the vehicle. In the past, a planetary gear arrangement has been employed in hybrid vehicles to turn over an internal combustion engine when it is to assist in driving the vehicle. However, in some hybrid designs, the planetary gear arrangement can cause an unacceptable torque disturbance manifested as a vehicle shuddering effect.

As an alternative to a planetary gear arrangement in a hybrid vehicle, a starter motor can be employed. For example, an integrated starter generator (ISG) can be used to both drive a vehicle and start an ICE. However, in many cases the ISG current draw necessary to start the engine is too high for the drive system DC-DC converter, causing it to sag in terms of voltage output. In a further configuration, a separate low voltage starter motor, rather than an ISG, can be used to start the ICE. In this type of configuration, the DC-DC converter can be coupled to the starter motor by a low voltage bus. A low voltage bus can also link a vehicle's low voltage battery and a low voltage load, such as lamps, exterior lights, a radio, and other vehicle accessories to the DC-DC converter. Thus a high voltage battery used in a conversion circuit to power an electric motor can be used to power low voltage vehicle accessories and a low voltage starter motor for an ICE through a DC-DC converter.

Unfortunately, this configuration suffers drawbacks as well. A conventional starter motor can draw a relatively large current that can cause a significant voltage drop, perhaps down to 6-8V, elsewhere along the voltage bus. In general, when a driver starts a conventional ICE vehicle, few, if any, accessories are turned on. Those accessories that are powered on may experience a brief flickering or fading that ends with the cranking of the engine, no more to occur during the drive. Because they occur temporarily only at the beginning of a vehicle's operation, the effects of a large starter motor current draw is not a significant issue for ICE vehicles. However, in a hybrid vehicle, an engine can be turned on and off frequently during a single driving episode. Repeated flickering lights or fading radio volume due to insufficient voltage on a low voltage bus can become an annoying, unacceptable nuisance to an HEV driver.

In the past, various solutions have been proposed to address the issue of voltage drops due to large starter current demand. For example, U.S. Patent publication 20090107443A1 to Sarbacker et al. discloses a controller for turning off the engine when the vehicle is idle, a motor/generator for starting the engine, an inverter for converting a DC auxiliary voltage from a battery into an AC voltage for powering the motor/generator, and a device for isolating a DC voltage from the DC auxiliary voltage to prevent voltage sag in a vehicle system during engine starting. The device includes a transformer, a rectifier/regulator, and an isolator. From a single energy storage device, such as a low voltage battery, a DC voltage can be isolated from a DC auxiliary voltage and provided to an auxiliary system comprising components that are susceptible to a voltage sag while an engine is being cranked. A method includes detecting a commanded engine start, comparing a measured auxiliary voltage to a threshold, isolating a predetermined DC voltage from a DC auxiliary voltage when the measured auxiliary voltage is less than the threshold, and powering the auxiliary vehicle system using the isolated DC voltage. The energy storage device can be charged by the motor/generator. The Sarbacker solution depends on a single battery providing sufficient voltage for both a starter motor and an auxiliary system. Sarbacker teaches the addition of a transformer, a regulator and an isolator, and relies on a comparison of voltages and a division of vehicle accessories between those that are subject to voltage sags and those that aren't.

U.S. Publication 20090243387 to Cohen et al. discloses a dual battery electrical system having a primary and a secondary load, and is switchable between an ON state in which the engine is running, an OFF state in which the engine is not running, a START state in which the primary load requires power to start the engine, and a PAUSE state in which the engine is not running. A first battery powers the primary load, requiring power to start an engine, and a second battery powers the secondary load, not requiring power to start an engine. A battery switch is closable to connect the first battery to the second battery such that both batteries can provide power to both loads. The switch is open or closed dependent on the vehicle condition and operational state. Cohen teaches disconnecting the two batteries so that the primary battery has sufficient charge to start an engine. In addition, the health of the primary battery can be checked prior to connecting or disconnecting the two batteries. As the Cohen invention is directed toward having sufficient power in the primary battery to start an engine, the issue of voltage sag in the secondary load is not emphasized.

SUMMARY OF THE INVENTION

In an example embodiment, the present invention provides a system and method for starting a hybrid vehicle ICE with a starter motor while maintaining stability in a low voltage bus that couples a DC-DC converter to a low voltage load. An example system can include a DC-DC converter configured for coupling to a high voltage battery, the converter configured to provide an output to a first low voltage bus configured to couple said converter to a low voltage load; a secondary battery coupled to a starter motor by a second low voltage bus, said starter motor configured to start an engine; and an isolation device configured to decouple said first and second low voltage buses. By way of example, the low voltage load can comprise vehicle lamps, exterior lights, radio and/or other accessories. When connected, both first and second low voltage buses receive voltage output from the DC-DC converter, which can be coupled to a high voltage battery. The isolation device can be configured to disconnect the first and second voltage buses during a start event for the engine, isolating the DC-DC converter from the starter motor. During the engine start event, the starter motor can draw current from the secondary battery via the second low voltage bus. Because the starter motor is separated from the first low voltage bus, the voltage provided to the low voltage load from the DC-DC converter is unaffected by starter current draw, and remains stable. Accordingly the operation of vehicle accessories that make up the low voltage load can continue uninterrupted.

The isolation device is further configured to recouple the first and second voltage buses following completion of the engine start event. When the two buses are connected, the high voltage battery can charge the secondary battery via the DC-DC converter. In an example embodiment, the isolation device can be in the form of a variable battery charging device that can block current to the second voltage bus during a start event, and resume current flow to the second voltage bus after completion of the start event at a variable rate to avoid problems caused by a large inrush current to the secondary battery after reconnection. In a further example, the coupling device can be in the form of a controllable relay switch.

An example method of the invention can include receiving an engine start request, and in response, isolating a DC/DC converter from a starter circuit; engaging a starter motor, determining that an engine is started, disengaging the starter motor, and recoupling the DC/DC converter to the starter circuit. In an example embodiment, the DC-DC converter is configured for coupling to a high voltage battery, and is configured for coupling to a low voltage load by a first low voltage bus. A starter circuit can comprise the starter motor coupled to a secondary battery by a second low voltage bus. In an exemplary embodiment, decoupling a DC/DC converter from the starter circuit comprises activating an isolation device that decouples the first low voltage bus from the second low voltage bus. This action isolates the DC-DC converter from the starter motor before it draws the current necessary to start the engine. During the starting event, the starter motor can be energized by the secondary battery since it remains coupled to the starter by the second low voltage bus. Likewise, recoupling the DC/DC converter to the starter circuit can comprise deactivating the isolation device to reconnect the first and second low voltage buses. While the first and second low voltage buses are coupled, the high voltage battery, through the DC-DC converter, can charge the secondary battery.

DETAILED DESCRIPTION OF EXAMPLE EMBODIMENTS

Example embodiments of the invention are presented herein; however, the invention may be embodied in a variety of alternative forms, as will be apparent to those skilled in the art. To facilitate understanding of the invention, and provide a basis for the claims, various figures are included in the specification. The figures are not drawn to scale and related elements may be omitted so as to emphasize the novel features of the invention. Structural and functional details depicted in the figures are provided for the purpose of teaching the practice of the invention to those skilled in the art and are not to be interpreted as limitations. For example, control modules for various systems can be variously arranged and/or combined and may not be depicted in illustrations of example embodiments herein in order to better emphasize novel aspects of the invention. In addition, system components can be variously arranged as known in the art.

Figure 1:
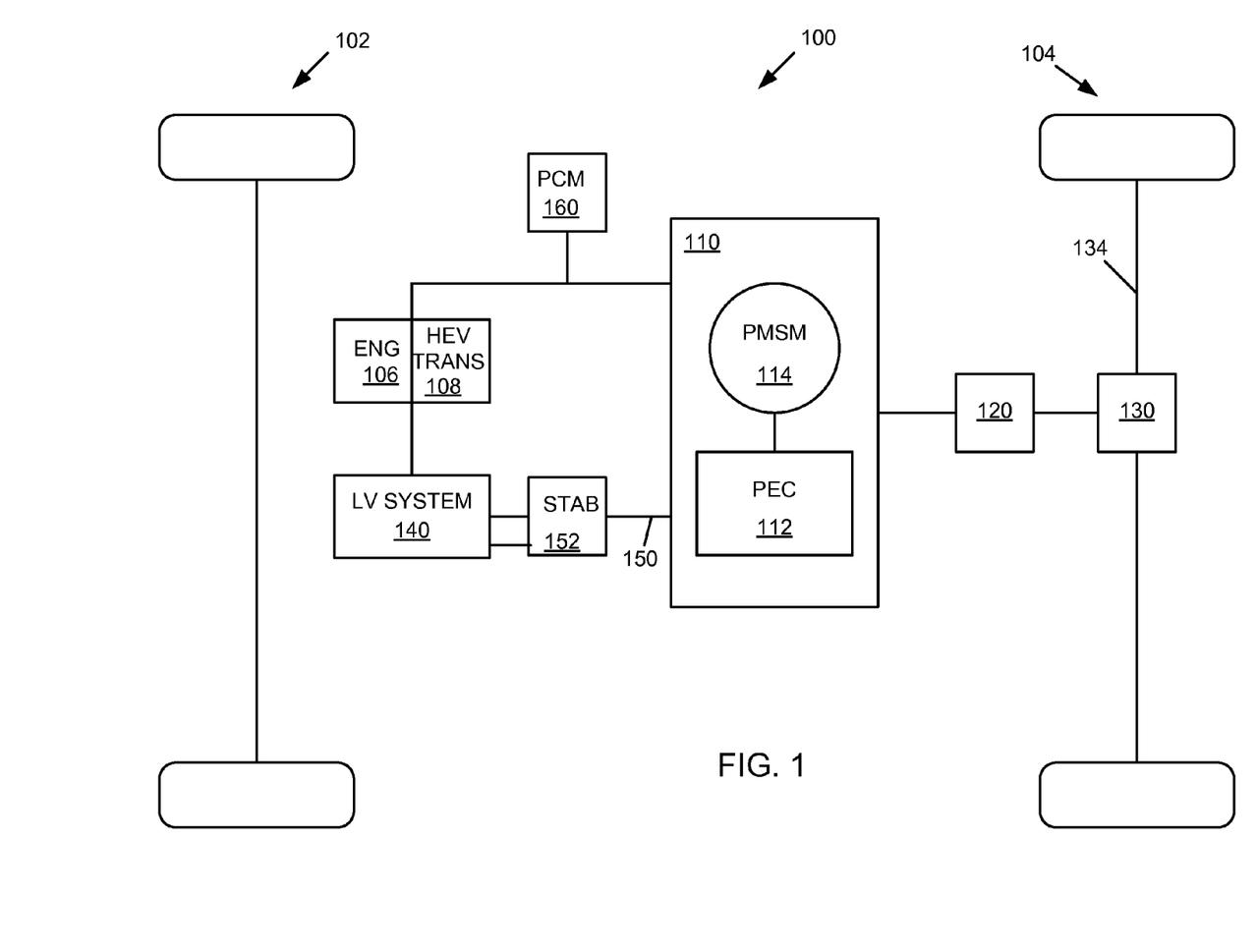
FIG. 1 shows an example system.

FIG. 1 shows a schematic of an example vehicle 100. The vehicle 100 can be of any suitable type, such as an electric, hybrid electric (HEV), or plug-in hybrid electric vehicle (PHEV). In at least one embodiment, the vehicle 100 can include a first wheel set 102, a second wheel set 104, an engine 106, an HEV transaxle 108 and an electric drive system 110. The electric drive system 110 can be configured to provide torque to the first and/or second wheel sets 102, 104, for example via a power transfer unit 120 and a differential 130. The electric drive system 110 can have any suitable configuration, and may be a parallel drive, series drive, or split hybrid drive as is known by those skilled in the art. As an example, the electric drive system 110 can include a power electronics converter (PEC) 112 coupled to a Permanent Magnet Synchronous Machine (PMSM) 114. It is contemplated that the PMSM 114 can function as a motor, converting electrical energy to kinetic energy, or as a generator, converting kinetic energy to electrical energy. In an example embodiment, the PEC 112 can be connected to a first PMSM functioning as a motor, and a second PMSM functioning as a generator.

The EDS 110 can be coupled to an engine 106 and HEV transaxle 108 with which it can cooperate to drive the vehicle. In addition, the EDS 110 can be coupled to a low voltage system 140. More specifically, the PEC 112 can be configured for coupling to the low voltage system 140 via a low voltage bus 150. To prevent the prior art problem of low voltage bus instability, a stabilizer 152, configured to stabilize the PEC 110 output voltage to the low voltage system 140 is included to prevent precipitous drops on the low voltage bus 150. A powertrain control module (PCM) 160, configured for monitoring and/or controlling various vehicle subsystems, such as the transmission system, the charging system, engine control system, as well as communicating with other onboard modules, can be coupled to the EDS 110, as well as other vehicle subsystems. For example, the PCM 160 can be in the form of an onboard computer or microprocessor in communication with various vehicle modules and controllers.

The power transfer unit 120 can be of any suitable type, such as, but not limited to, a multi-gear "step ratio" transmission, continuously variable transmission, or an electronic converterless transmission as is known by those skilled in the art. The power transfer unit 120 may be adapted to drive one or more vehicle wheels and can be selectively coupled to at least one PMSM 114. In the embodiment shown in FIG. 1, the power transfer unit 120 is connected to a differential 130 in any suitable manner, such as with a driveshaft or other mechanical device. The differential 130 can be connected to each wheel of the wheel set 104 by a shaft 134, such as an axle or halfshaft.

Figure 2:
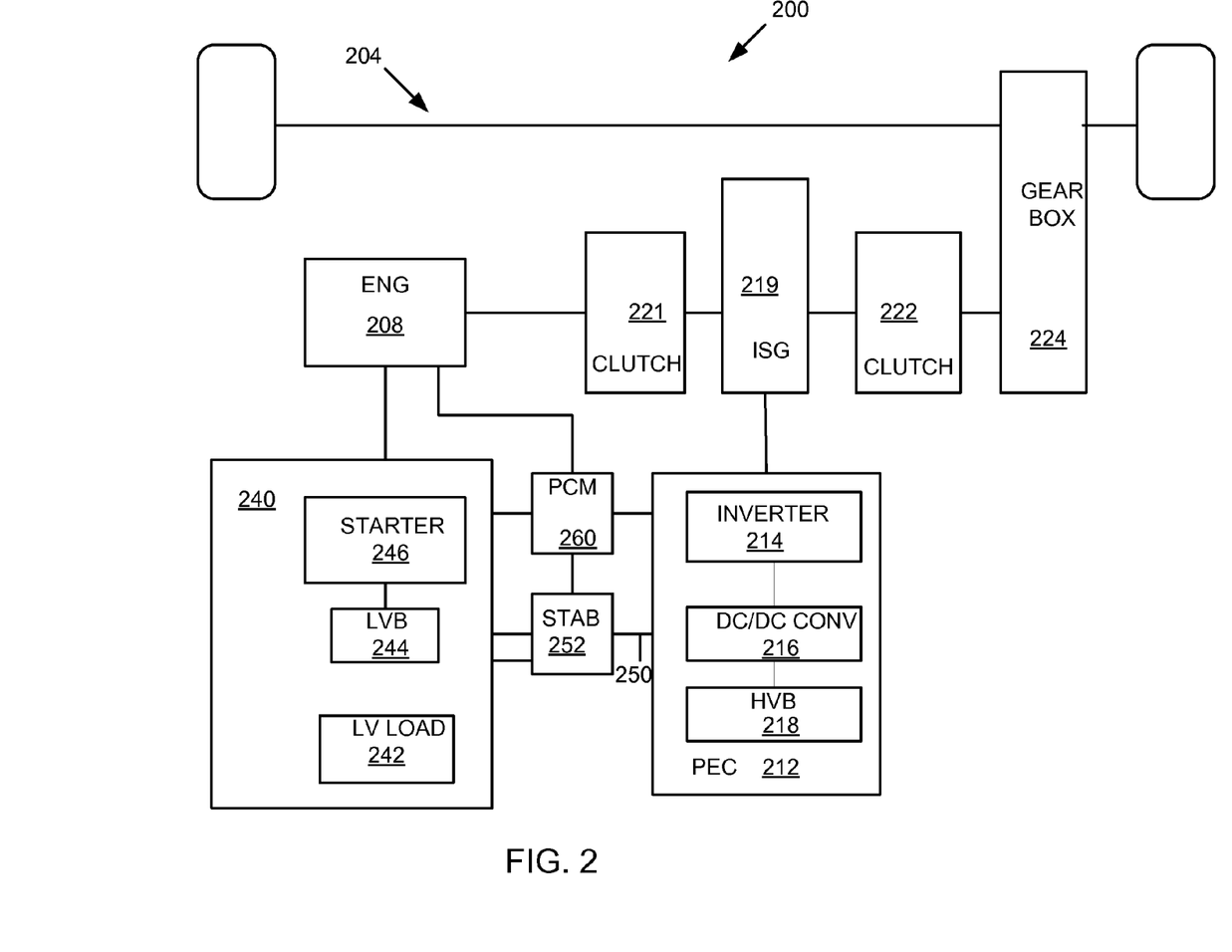
FIG. 2 shows an example system.

FIG. 2 depicts an example system 200. As part of an electric drive system, a PEC 212 can be configured to provide power to a motor embodied as an ISG 219. The ISG 219 can cooperate with an engine 208 to drive a wheel set 204. The ISG 219 can be selectively coupled to the engine 208 through a disconnect clutch 221, which allows the ISG 219 to be coupled to or isolated from the engine 208. Similarly, a launch clutch 222 can isolate the ISG 219 from, or couple it to, a gear box 224 in order to drive the wheel set 204. In addition to powering the ISG 219, the PEC 212 can also provide power to a low voltage system 240 via a low voltage bus 250 having a stabilizer 252. The stabilizer 252 can be configured to prevent voltage output from the PEC 212 from falling too low to adequately power the low voltage system 240.

The example PEC 212 can include an inverter 214, a DC-DC converter 216, and a high voltage battery 218. The DC-DC converter 216 can be configured to convert input voltage from the high voltage battery 218 to an output voltage used by the inverter 214 to provide three-phase current to the ISG 219 as known in the art. The DC-DC converter 216 can be in the form of a variable voltage converter that can operate in a boost or buck mode to provide power to the inverter or to provide charge to the high voltage battery 218, also referred to as the primary battery, through regenerative braking as known in the art. The high voltage battery 218 can be in the form of a multi-celled nickel metal hydride battery or lithium ion battery. For example the high voltage battery can comprise 100-200 series connected cells that combined can provide a voltage of around 330V.

The PEC 212 can be coupled to the low voltage system 240 via the low voltage bus 250 and the stabilizer 252. The low voltage system 240 can include a low voltage load 242. In an example embodiment, the low voltage load comprises various low voltage vehicle accessories, such as interior lamps, exterior lights, radio, wipers, ventilation fans, and the like. The low voltage system 240 can further include a low voltage battery 244, also referred to as a secondary battery, which can be embodied as a nominal 12-volt vehicle battery. The low voltage system 240 can also include a starter motor 246 coupled to the low voltage battery 244 and configured to crank the engine 208. In an exemplary embodiment, the high voltage battery 218 can provide voltage to the low voltage system 240 through the DC/DC converter 216 and the low voltage bus 250. The stabilizer 252 is configured to stabilize the low voltage bus 250 voltage so as to maintain a sufficient voltage to the low voltage load 242 so that the voltage requirements of various vehicle accessories can be satisfied.

Figure 3:
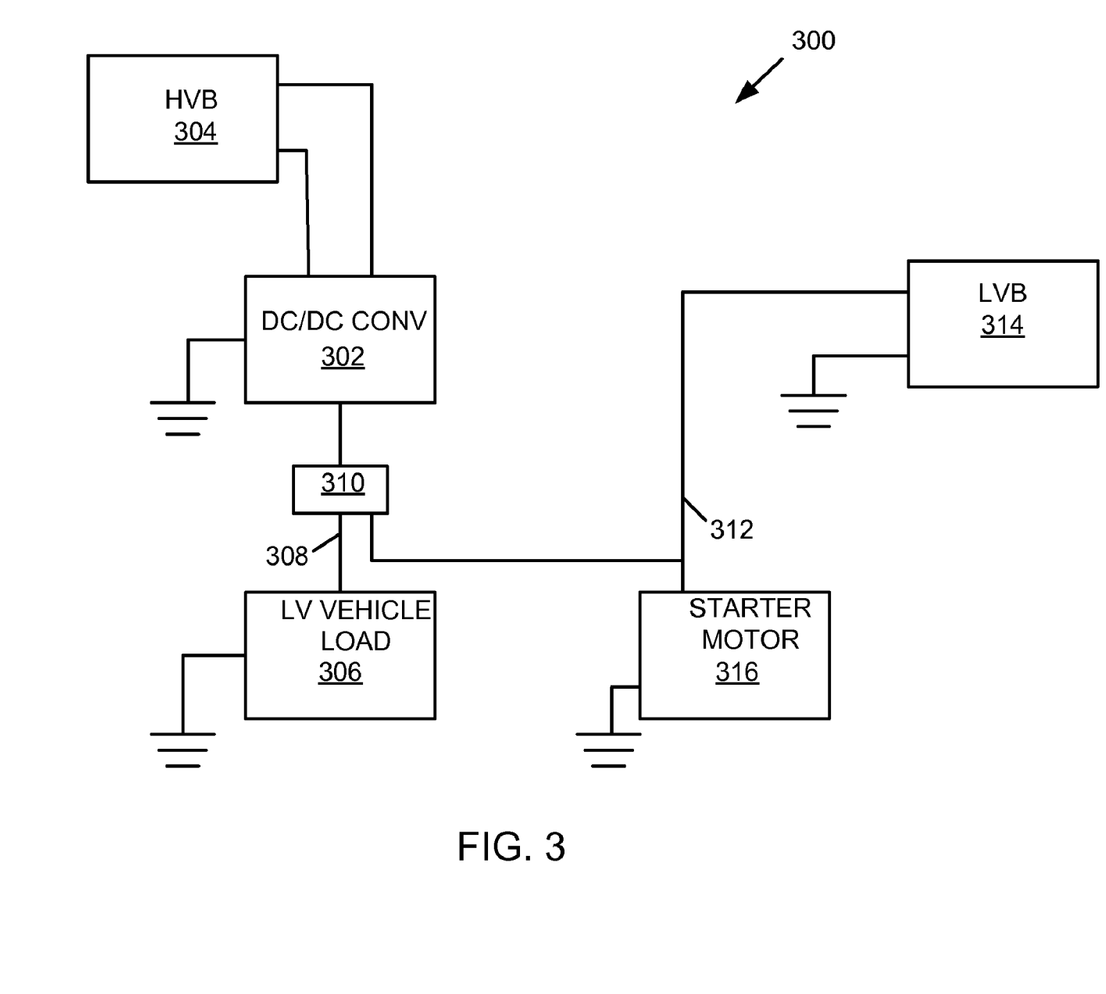
FIG. 3 shows an example system.

FIG. 3 provides an example system 300 with a stabilized low voltage bus providing an output voltage from a power conversion system. A DC/DC converter 302 is configured to for coupling to a high voltage battery 304. An output voltage from the DC/DC converter 302 can be provided to a first low voltage bus 308 that couples the DC/DC converter to the low voltage vehicle load 306 which, in an exemplary example, comprises low voltage vehicle accessories such as those discussed previously herein. The first low voltage bus 308 can be coupled to a second low voltage bus 312 that couples a secondary battery, shown here as a low voltage battery 314, with a starter motor 316. The first and second low voltage buses 308, 312 can be coupled together at a stabilizer embodied as an isolation device 310 that can controllably couple or decouple them. When coupled together, the high voltage battery 304 can charge the low voltage battery 314 through the DC/DC converter 302 and low voltage buses 308 and 312. At the same time, the high voltage battery 304 can power the vehicle load 306 through the DC/DC converter 302 and low voltage bus 308.

During an engine start event, the isolation device 310 can disconnect the first and second low voltage buses 308, 312, separating the DC/DC converter 302 from the starter motor 316, and shielding the converter 302 from the starter 316 current demand. The secondary battery, low voltage battery 314, can remain coupled to the starter motor 316 by the low voltage bus 312 to provide the current necessary to crank an engine. The DC/DC converter 302 can remain coupled to the vehicle load 306 by the first voltage bus 308 to provide the voltage required by various vehicle accessories while the starter motor 316 starts the engine. Accordingly, lights, lamps, entertainment devices and the like can continue to operate without interruption during engine start events.

In an example embodiment, the isolation device 310 can be in the form of a variable battery charging device configured to provide a variable current to the low voltage battery 314. During an engine start event, the variable battery charging device can limit the current to a low level, or completely prevent current flow to the voltage bus 312, to effectively protect the DC/DC converter 302 from the high current demand of the starter motor 316. After completion of the engine start event, and disengagement of the starter motor 316, the variable charging device can reconnect the first and second voltage buses 308, 312, gradually increasing current to the second voltage bus 312 to protect the low voltage battery 314 from a large inrush current and its potential adverse effects.

As a further example embodiment, the isolation device 310 can be in the form of a controllable relay. For example, a series of relays staged in with one or more resistors can be controlled by a microprocessor to selectively allow or prevent current flow from the first voltage bus 308 to the second low voltage bus 312. In an exemplary embodiment, the PCM 160 or a DC/DC converter 302 microprocessor (not shown) can control the relay circuit so that the circuit is open (no current) during engine start events.

Figure 4:
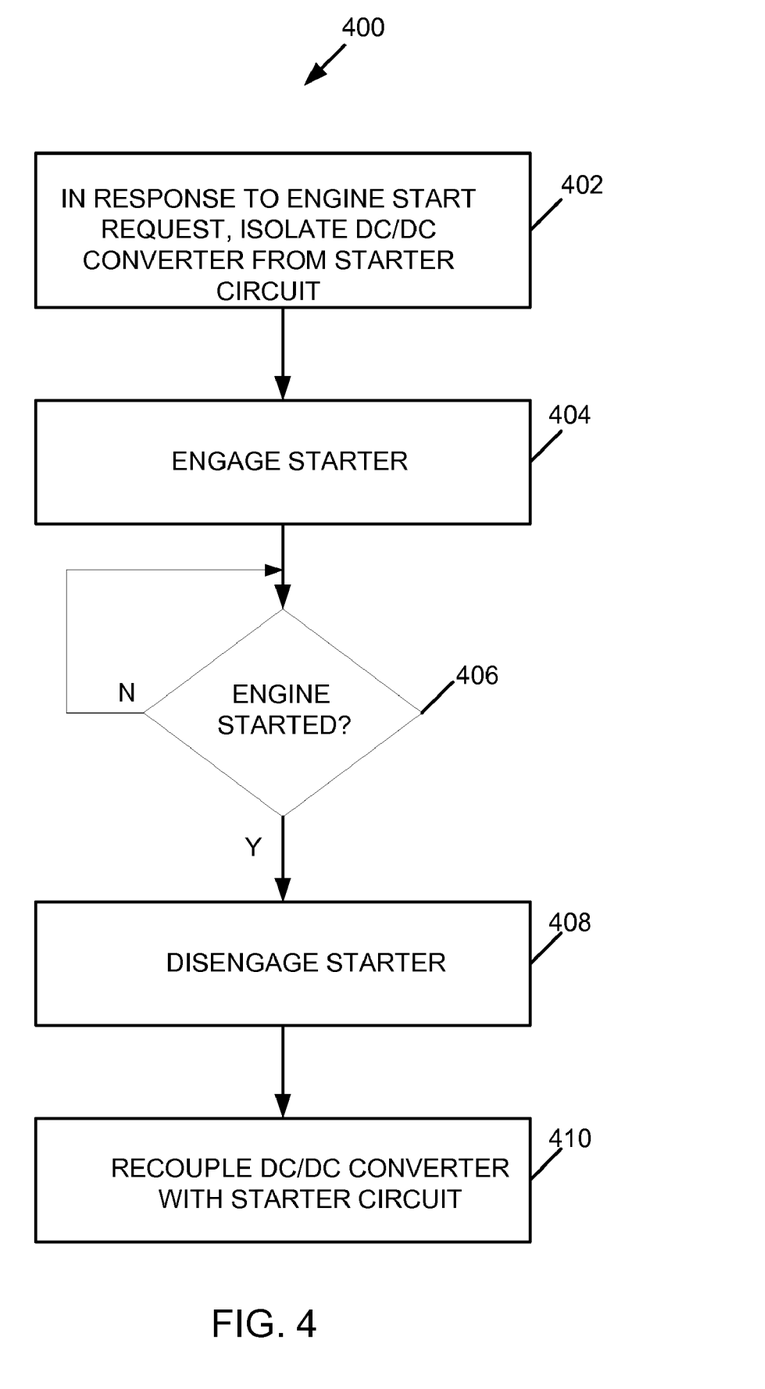
FIG. 4 shows a flow diagram of an example method.

FIG. 4 depicts a flow diagram of an example method 400 of the invention. In an exemplary embodiment, logic for implementing the method 400 can be stored in a memory (not shown) of PCM 160. In an exemplary embodiment, the PCM 160 is responsible for the commands to the clutches 221, 222, the starter motor 246, the stabilizer 252, as well as other vehicle components, subsystems and controllers. At block 402, in response to an engine start request, a DC/DC converter can be isolated from a starter circuit. In an exemplary embodiment, the PCM 160 can receive a start engine request; for example, a start request can be generated in response to an increased power demand, such as can occur during an acceleration event. In response to receiving an engine start request, the PCM 160 can activate the isolation device 310 to disconnect the first voltage bus 308 between the DC/DC converter 302 and the voltage load 306, from a starter circuit comprising the low voltage battery 314 and the starter motor 316 coupled by the low voltage bus 312. For example, the PCM 160 can activate the isolation device 310, embodied as a variable battery charging device, to limit or cut off current flow between the first and second low voltage buses 308, 312, effectively separating the DC/DC converter 302 from the starter motor 316 and the low voltage battery 314. In an embodiment in which the isolation device 310 is embodied as a controllable relay, the PCM 160, or other controller device such as a microprocessor, can open the relay to prevent current flow from the DC/DC converter 302 to the second low voltage bus 312.

At block 404 a starter can be engaged. For example, after the starter circuit comprising the starter motor 316 and the low voltage battery 314 has been isolated from the DC/DC converter 302, the PCM 160 can engage the starter motor 316. While attempting to start the engine 108, the starter motor 316 can pull current from the low voltage battery 314. Because the isolation device 310 prevents current flow from the DC/DC converter 302 to the starter motor 316 during the engine start event, the voltage output of the DC/DC converter 302 is unaffected by the starter motor 316 current draw. The voltage requirement of the vehicle load 306 can be fully satisfied by the high voltage battery 304 through the DC/DC converter 302. Accordingly, the performance of any operating vehicle accessories can continue without being adversely affected by the starter motor 316 current draw.

At decision block 406 a determination can be made as to whether an engine has been started. For example, sensors (not shown) at the engine 108 can detect an engine start, providing confirmation of engine start to the PCM 160. Alternatively, a current monitor sensing a starter current near zero can indicate that the engine has been started. After a successful engine start, at block 408 the starter motor can be disengaged. For example, the PCM 160 can command the starter motor 316 to disengage. After the starter motor 316 has been disengaged, the DC/DC converter 302 can be recoupled to the starter circuit at block 410. For example, the isolation device 310 can be deactivated to recouple the first and second low voltage buses 308, 312, allowing current flow from the DC/DC converter 302 to the starter circuit. When embodied as a variable charging device, the isolation device 310 can provide a relatively small current upon reconnection, so as to avoid large inrush currents to the low voltage battery 314. Recoupling the DC/DC converter to the starter circuit allows the high voltage battery 304 to charge the low voltage battery 314. The current through the variable battery charging device can subsequently be increased over time. When embodied as a controllable relay, the relay or relay series can be closed by the PCM 160 to allow current flow from the DC/DC converter 302 to the second voltage bus 312 to recharge the low voltage battery 314.

In a preferred embodiment, a method of the invention includes waiting a predetermined delay period after the starter is disengaged prior to recoupling the DC/DC converter 302 to the starter circuit. This delay period gives the low voltage battery 314 additional time to recover from its charge depletion by the starter motor 316 before recharging it, further mitigating any potential inrush current effects. For ease of reference, the isolator device 310 is depicted outside the confines of the DC/DC converter 302 box. However, it is understood that a stabilizer, and more specifically the isolator device 310, can be variously positioned. For example, a stabilizer can be within a DC/DC converter to link a first and second voltage bus.

Figure 5:
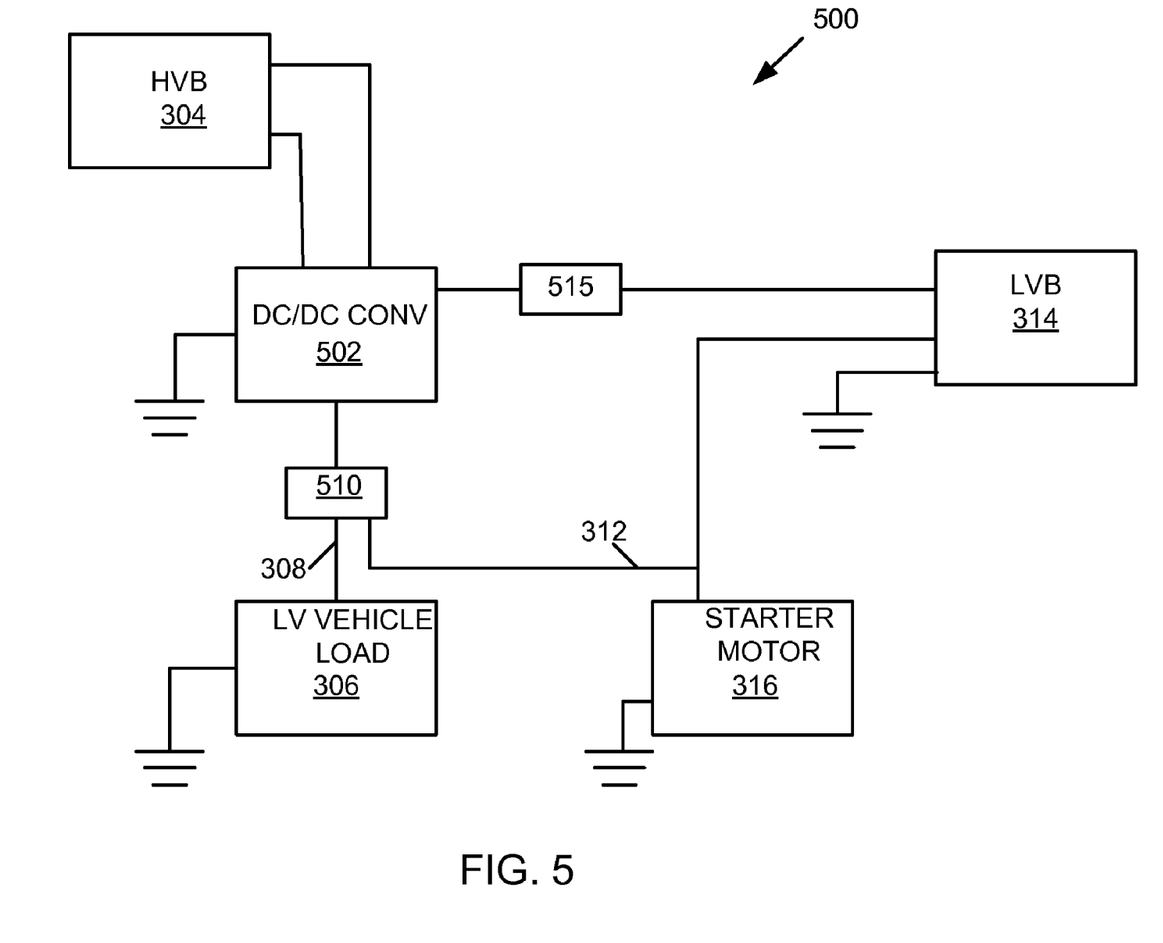
FIG. 5 shows an example system of the invention.

In yet a further example embodiment 500, a separate current-limited circuit can be used to charge a secondary battery following completion of an engine start event. For example, a first and second voltage bus, 308, 312 respectively, can be configured as shown in FIG. 5, coupled by a stabilizer in the form of an isolation device 510. The isolation device 510 can be in the form of a controllable relay as discussed above that can controllably decouple the first and second voltage buses 308, 312. A second output from the DC/DC converter 502 can comprise a current-limited circuit that can link the DC/DC converter 502 with the low voltage battery 314. For example a current limiting device 515 can be employed so that the current-limited circuit can provide a maximum current of around 20 A to the secondary battery 314. After completion of a start event, before recoupling the buses 308, 312, the battery 314 can be charged by the DC/DC converter 502 through the current limiter 515 circuit, which protects the secondary battery 314 from large inrush current. After a predetermined time period has elapsed after disengaging the starter motor 316, or after the secondary battery 314 has regained its charge, the isolation device 510 can be deactivated to couple the first and second low voltage buses 308, 312, thereby coupling the low voltage battery 314 to the DC/DC converter 502 through a circuit that is not current limited.

Thus the invention provides a system and method for using the power conversion system of a hybrid vehicle in conjunction with a vehicle's low voltage battery to provide sufficient current and voltage to both a starter motor and various vehicle accessories without adversely affecting the accessories' performance. By isolating a DC/DC converter from a starter motor during engine start events, a DC/DC converter coupled to a high voltage battery can fully satisfy low voltage vehicle load requirements, while the vehicle's low voltage battery can satisfy the current demand from the starter motor. Recoupling the DC/DC converter to the starter circuit that connects the starter motor with the low voltage battery allows the high voltage battery to charge the low voltage battery, so that it has sufficient charge for the next starting event. The invention provides a system and method that addresses voltage sag in a hybrid vehicle in an efficient cost-effective manner that uses a vehicle's primary and secondary battery without necessitating the addition of dedicated energy conversion systems or transformers or upsizing the DC/DC converter output capability.

The invention claimed is:

1. A system comprising:
a DC-DC converter configured for coupling to a high voltage battery, said converter configured to provide an output to a first low voltage bus, said first low voltage bus configured for coupling said converter to a low voltage load;
a starter circuit comprising a secondary battery coupled to a starter motor by a second low voltage bus, said starter motor configured to start an engine; and
a stabilizer coupled to said first and second voltage buses and configured to stabilize said converter output to said first voltage bus.

2. The system of claim 1, wherein said stabilizer comprises an isolation device configured to isolate said DC-DC converter from said starter circuit.

3. The system of claim 2, wherein said isolation device comprises a variable battery charging device configured to vary current flow to said second voltage bus.

4. The system of claim 3, wherein said variable battery charging device is configured to provide a low current to said second voltage bus to avoid a large inrush current to said secondary battery.

5. The system of claim 2, wherein said isolation device comprises a controllable relay.

6. The system of claim 1, wherein said stabilizer is configured to decouple said first and second low voltage buses.

7. The system of claim 6, wherein said stabilizer is controllable to decouple said first and second low voltage buses prior to engaging said starter motor to start said engine.

8. The system of claim 7, wherein said stabilizer is configured to recouple said first and second voltage buses after disengagement of said starter motor.

9. The system of claim 1, wherein said low voltage load comprises at least one vehicle accessory.

10. The system of claim 1, wherein said secondary battery comprises a low voltage battery.

11. The system of claim 1, wherein said high voltage battery is configured to charge said starter motor through said DC/DC converter and said second voltage bus.

12. A method, comprising:
in response to an engine start request, isolating a DC/DC converter from a starter circuit;
engaging a starter motor to start an engine;
determining that said engine is started;
disengaging said starter motor; and
recoupling said DC/DC converter to said starter circuit.

13. The method of claim 12, wherein said DC/DC converter is configured for coupling to a high voltage battery.

14. The method of claim 12, wherein said DC/DC converter is configured for coupling to a low voltage load by a first voltage bus.

15. The method of claim 14, wherein said starter circuit comprises a secondary battery coupled to said starter motor by a second voltage bus.

16. The method of claim 15, wherein said secondary battery comprises a low voltage battery.

17. The method of claim 14, wherein said low voltage load comprises a vehicle accessory.

18. The method of claim 12, wherein said isolating a DC/DC converter from a starter circuit comprises activating an isolation device configured to decouple a first low voltage bus configured to couple said DC/DC converter to a low voltage load from a second low voltage bus configured to couple said starter motor to a secondary battery.

19. The method of claim 12, wherein said recoupling said DC/DC converter to said starter circuit comprises deactivating an isolation device configured to decouple a first low voltage bus configured to couple said DC/DC converter to a low voltage load from a second low voltage bus configured to couple said starter motor to a secondary battery.

20. The method of claim 12, further comprising waiting a predetermined delay period after said determining said engine is started before said recoupling said DC/DC converter to said starter circuit.

21. The method of claim 12, wherein said recoupling comprises providing a variable current to said starter circuit to avoid a large inrush current to a secondary battery in said starter circuit.

* * * * *